US010167088B2

(12) United States Patent
Clark et al.

(10) Patent No.: US 10,167,088 B2
(45) Date of Patent: Jan. 1, 2019

(54) CROSSWIND PERFORMANCE AIRCRAFT ENGINE SPINNER

(71) Applicant: General Electric Company, Schenectady, NY (US)

(72) Inventors: Adam Wayne Clark, Cincinnati, OH (US); Richard David Cedar, Cincinnati, OH (US); David Baker Riddle, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 242 days.

(21) Appl. No.: 14/886,262

(22) Filed: Oct. 19, 2015

(65) Prior Publication Data

US 2017/0106991 A1    Apr. 20, 2017

(51) Int. Cl.
*F01D 5/02*    (2006.01)
*B64D 33/02*    (2006.01)
(Continued)

(52) U.S. Cl.
CPC .............. *B64D 33/02* (2013.01); *F01D 5/02* (2013.01); *F01D 25/24* (2013.01); *F02C 7/04* (2013.01);
(Continued)

(58) Field of Classification Search
None
See application file for complete search history.

(56) References Cited

U.S. PATENT DOCUMENTS 4,129,984 A * 12/1978 Nelson .................... F02C 7/047
137/15.1
4,393,650 A *  7/1983 Pool ........................ F02C 7/047
416/132 R
(Continued)

FOREIGN PATENT DOCUMENTS

EP        0 393 283 B1     10/1993
GB        2 363 170 A      12/2001
(Continued)

OTHER PUBLICATIONS

Extended European Search Report and Opinion issued in connection with corresponding EP Application No. 16194478.0 dated Mar. 8, 2017.
(Continued)

*Primary Examiner* — Igor Kershteyn
*Assistant Examiner* — Theodore Ribadeneyra
(74) *Attorney, Agent, or Firm* — General Electric Company; Brian Overbeck

(57) ABSTRACT

Aircraft gas turbine engine spinner includes conical forward spinner section extending aftwardly from spinner tip to a curved aft spinner section circumscribed about centerline axis, a spinner aspect ratio greater than about 1.8, and wherein spinner aspect ratio is an axial distance between spinner tip and spinner end divided by radial distance from axis to spinner end. Aspect ratio may be in a range of about 2.0-2.2 or about 2.2-2.8. Aft spinner section may be substantially tangential to platform leading edges of platforms of fan blades. Aft spinner section may have cambered or an elliptical axially curved cross-section.
Spinner axial cross-section may have longer spinner axial distance compared to baseline axial distance of baseline cross-section and spinner aspect ratio greater than baseline aspect ratio of baseline cross-section.

20 Claims, 2 Drawing Sheets

(51) Int. Cl.
  *F01D 25/24* (2006.01)
  *F02C 7/04* (2006.01)
  *B64C 11/14* (2006.01)
(52) U.S. Cl.
  CPC ...... *B64C 11/14* (2013.01); *B64D 2033/0286* (2013.01); *F05D 2220/323* (2013.01); *F05D 2240/20* (2013.01); *F05D 2250/232* (2013.01); *F05D 2250/51* (2013.01); *Y02T 50/671* (2013.01)

(56) References Cited

U.S. PATENT DOCUMENTS

| | | | |
|---|---|---|---|
| 5,058,617 A | | 10/1991 | Stockman et al. |
| 5,182,906 A | * | 2/1993 | Gilchrist ............ F02C 7/05 416/245 R |
| 5,224,833 A | | 7/1993 | Nicholas et al. |
| 5,259,724 A | | 11/1993 | Liston et al. |
| 6,358,014 B1 | | 3/2002 | Chou et al. |
| 6,416,280 B1 | | 7/2002 | Forrester et al. |
| 7,735,776 B2 | | 6/2010 | Chanez et al. |
| 7,739,865 B2 | | 6/2010 | Prasad et al. |
| 7,797,944 B2 | | 9/2010 | Morford et al. |
| 8,286,654 B2 | | 10/2012 | Prasad et al. |

FOREIGN PATENT DOCUMENTS

| | | |
|---|---|---|
| JP | S58-19847 B2 | 4/1983 |
| JP | H10-196455 A | 7/1998 |
| JP | 2003-035205 A | 2/2003 |
| JP | 2004-137950 A | 5/2004 |
| WO | WO 2014/137685 A1 | 9/2014 |
| WO | 2014/123685 A1 | 12/2017 |

OTHER PUBLICATIONS

Flight Operations Support, Tuesday, Dec. 13, 2005, CFM56-3 vs −7B Design, Spinner shape.
Machine Translation and Notification of Reasons for Refusal issued in connection with corresponding JP Application No. 2016-196837 dated Dec. 12, 2017.

* cited by examiner

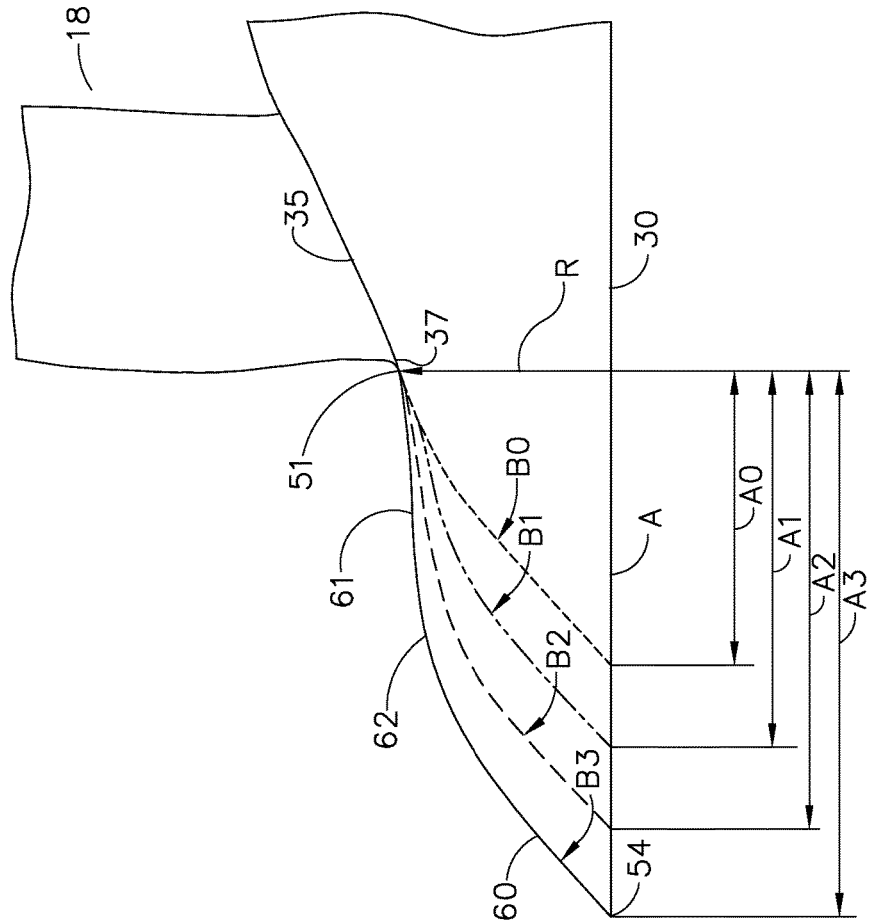
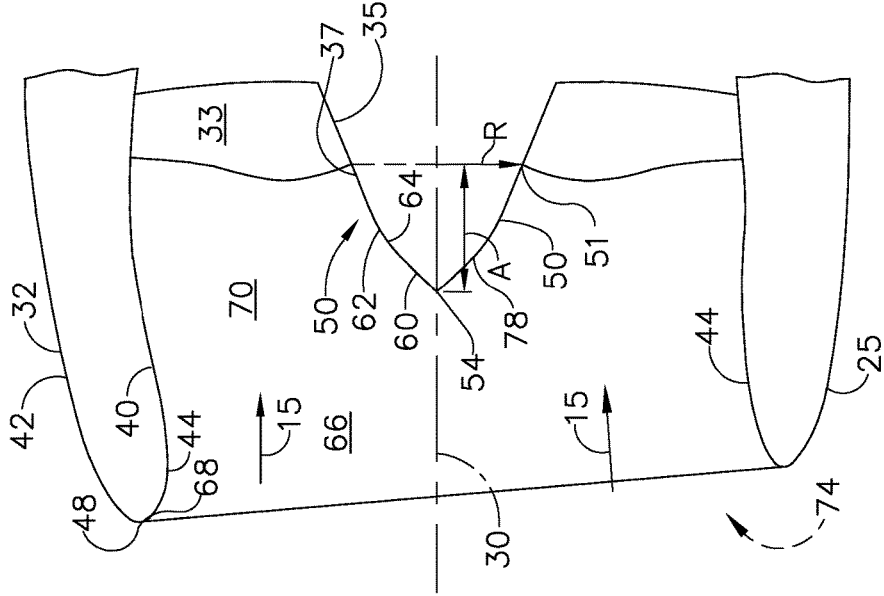
FIG. 3
FIG. 2

CROSSWIND PERFORMANCE AIRCRAFT ENGINE SPINNER

BACKGROUND OF THE INVENTION

Technical Field

The present invention relates to aircraft engine spinners and, more particularly, to shape and size of the spinners.

Background Information

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and a fan in the fan section. The compressor section typically includes low and high pressure compressors, and the turbine section includes low and high pressure turbines.

The fan section includes an inlet which in part may be formed by a nacelle surrounding the fan section and leads to a fan in the fan section. Jet engine operations in crosswinds and at high angles of attack can be significantly restricted by fan blade aeromechanics and operability limits. Airframers seek to minimize or eliminate such engine operational restrictions in order to prevent having to impose aircraft operational limits. Conventional methods of improving inlet performance in crosswinds or at high angles of attack have involved shape changes to the inlet geometry. Such changes often negatively affect the performance at other critical operating points, such as cruise. It is, thus, highly desirable to improve inlet performance in crosswinds without substantially negatively affecting cruise performance.

SUMMARY OF THE INVENTION

An aircraft gas turbine engine spinner for mounting to a rotor of an aircraft gas turbine engine. The spinner including a conical upstream or forward spinner section extending aftwardly from a spinner tip followed by a curved downstream or aft spinner section, the spinner circumscribed about an axial centerline axis, the spinner having a spinner aspect ratio greater than about 1.8, and wherein the spinner aspect ratio is an axial distance between the spinner tip and a spinner end divided by a radial distance from the engine axial centerline axis to an outer surface of the spinner.

The spinner aspect ratio may be in a range of about 2.0-2.2 or about 2.2-2.8.

The aft spinner section may be substantially tangential to platform leading edges of platforms of the fan blades. The aft spinner section may have a cambered or an elliptical axially curved cross-section. The forward spinner section may be substantially tangential to the aft spinner section at their intersection.

The spinner may include a spinner axial cross-section having a longer spinner axial distance as compared to a baseline axial distance of a baseline cross-section and the spinner aspect ratio greater than a baseline aspect ratio of the baseline cross-section.

An aircraft gas turbine engine fan assembly includes a fan casing surrounding an array of fan blades mounted to and extending radially outwardly from a rotor circumscribed about a centerline axis, a nacelle surrounding the fan casing, a spinner circumscribing the centerline axis and mounted to the rotor, the spinner including a conical upstream or forward spinner section extending aftwardly from a spinner tip followed by a curved downstream or aft spinner section, the spinner circumscribed about a centerline axis, the spinner having a spinner aspect ratio greater than about 1.8, and wherein the spinner aspect ratio is an axial distance between the spinner tip and a spinner end divided by a radial distance from the engine axial centerline axis to an outer surface of the spinner.

The assembly may further include a spinner axial cross-section having a longer spinner axial distance as compared to a baseline axial distance of a baseline cross-section, the spinner aspect ratio greater than a baseline aspect ratio of the baseline cross-section, the spinner axial cross-section shaped and sized to improve crosswind and/or high angle of attack performance of the assembly over that of the baseline cross-section. The spinner axial cross-section may be sized and shaped at a station or axial distance along the centerline axis to change aerodynamics of flow through the inlet to create improvements in crosswind or high angle of attack performance relative to that of the baseline cross-section.

BRIEF DESCRIPTION OF THE DRAWINGS

The invention, in accordance with preferred and exemplary embodiments, is more particularly described in the following detailed description taken in conjunction with the accompanying drawings in which:

FIG. 2 is a cross-sectional illustration of an inlet and fan section and the spinner illustrated in FIG. 1.

FIG. 3 is diagrammatical illustration of some exemplary embodiments of the crosswind resistant spinner illustrated in FIG. 2.

DESCRIPTION

Figure 1:
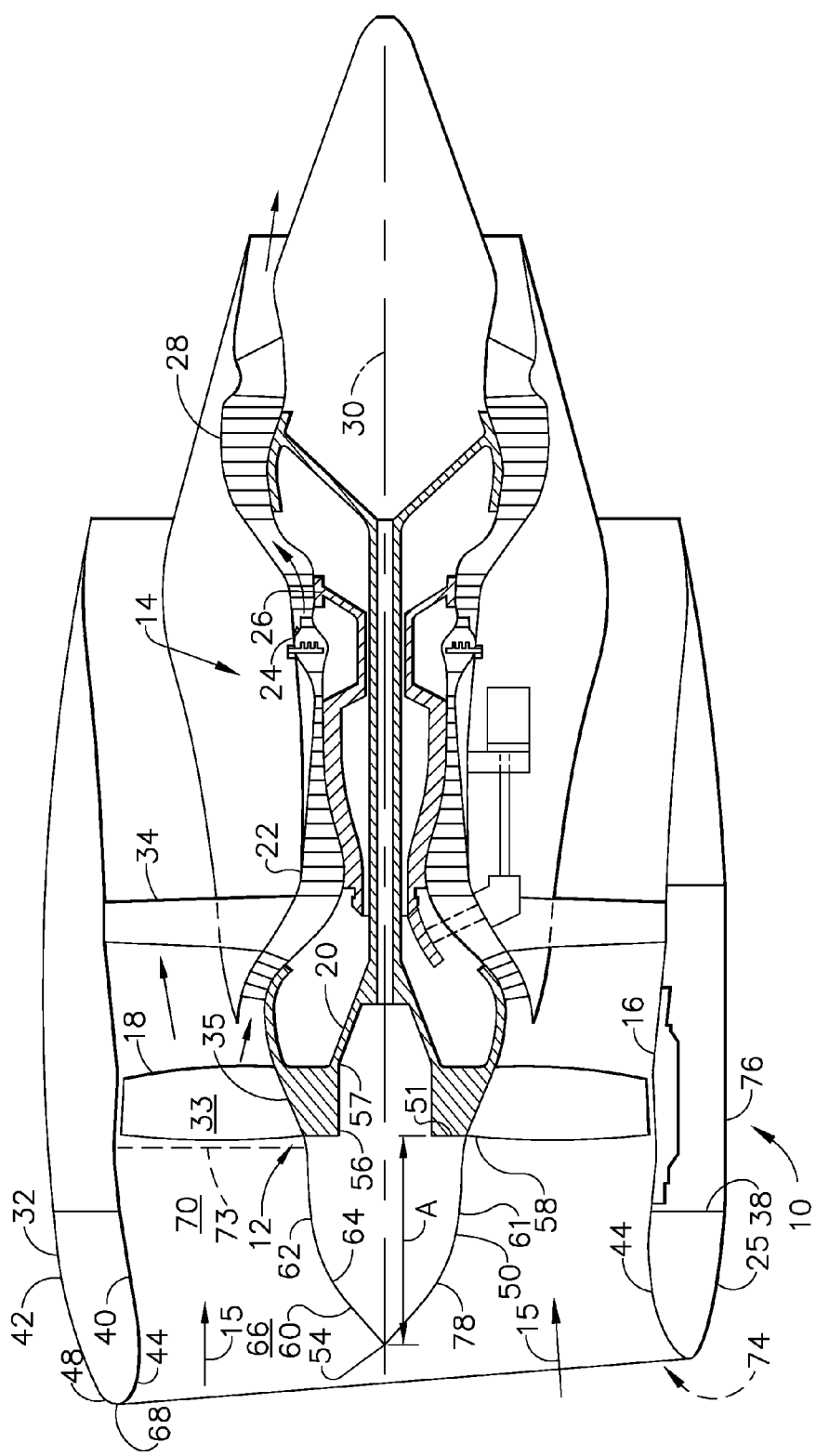
FIG. 1 is a cross-sectional illustration of an exemplary aircraft turbofan gas turbine engine including a crosswind resistant spinner.

Illustrated in FIG. 1 is an exemplary embodiment of an aircraft gas turbine engine 10 including a fan assembly 12 and a core engine 14 rotatable about a longitudinally extending engine axial centerline axis 30. The fan assembly 12 includes a fan casing 16 surrounding an array of fan blades 18 extending radially outwardly from a rotor 20. Fan blade airfoils 33 extend radially outwardly from the fan blade platform 35 of each of the fan blades 18. Alternatively, the blades and airfoils may be mounted on a BLISK of the rotor. The core engine 14 includes a high-pressure compressor 22, a combustor 24, a high pressure turbine 26. A low pressure turbine 28 drives the fan blades 18.

The engine 10 is mounted within a nacelle 32 connected to the fan casing 16 of the engine 10. The fan casing 16 is surrounded by and disposed within the nacelle 32 and circumscribed about the fan blades 18 and supports the fan assembly 12 through a plurality of circumferentially spaced struts 34. The nacelle 32 includes an annular inlet 25 attached to a forward casing flange 38 on the fan casing 16 by a plurality of circumferentially spaced fasteners, such as bolts or the like. The nacelle 32 typically includes radially spaced apart annular inner and outer barrels 40, 42. A fan inlet flowpath 66 extends downstream from an inlet leading edge 68 through the inlet 25 and includes an inlet throat 44 of minimum flow area disposed downstream from the inlet leading edge 68. An annular diffuser 70 extends downstream from the throat 44. A rounded annular nose lip section 48 is radially disposed between the inner and outer barrels 40, 42 and includes the inlet leading edge 68 and the inlet throat 44. Engine air 15 entering the engine 10 passes through the inlet 25.

Further referring to FIGS. 2 and 3, an improved crosswind performance fan spinner 50 mounted to rotor 20. The fan spinner 50 extends downstream from a spinner tip 54 to a spinner end 51 which is connected to a fan hub 56 at a forward end 57 of the rotor 20. The spinner 50 may be connected to a fan hub leading edge 58. The fan blades 18 extend radially outwardly from the fan hub 56. The spinner 50 is shaped and sized to improve crosswind and possibly high angle of attack performance of the fan assembly 12 by controlling the diffusion and pressure gradients inside the inlet 25. The spinner 50 is designed to improve crosswind and possibly high angle of attack performance of the fan assembly 12 by reducing the extent or severity of flow separation within the inlet 25 through careful aerodynamic consideration of the spinner shape and size.

The improved design of the spinner shape may include increasing the size of the spinner at a specific station or axial distance A along the centerline axis 30 in order to improve crosswind and possibly high angle of attack performance of the fan assembly 12 by controlling the diffusion and pressure gradients inside the inlet 25.

FIG. 3 illustrates three embodiments of spinner axial cross-sections. The spinner 50 includes a conical upstream or forward spinner section 60 followed by an elliptical or otherwise curved downstream or aft spinner section 62. The conical forward spinner section 60 and the curved aft spinner section 62 may be substantially tangential at their intersection 64. The curved aft spinner section 62 is axially curved in cross-section as illustrated in FIGS. 1-3. The aft spinner section 62 may be also be substantially tangential to platform leading edges 37 of the platforms 35 of the fan blades 18.

The general shape of the improved crosswind performance spinner 50 disclosed herein is called coniptical because of the two combined shapes of the conical forward spinner section 60 and the elliptical or curved aft spinner section 62. Coniptical, conical, and elliptical spinners have been used in various models of GE aircraft gas turbine engines. The curved shape of the elliptical or curved aft spinner section 62 may not be purely elliptical. It may be described as polynomial curved. The curved aft spinner section 62 may also be described as cambered.

The improved crosswind performance spinner 50 has a particular size defined by a spinner aspect ratio A/R of the spinner 50. A is an axial distance between the spinner tip 54 and the fan hub leading edge 58. The axial distance A between the spinner tip 54 and the fan hub leading edge 58 may also be used to denote the length of the spinner 50. R is a radial distance from the engine axial centerline axis 30 to the fan hub leading edge 58. The aspect ratio A/R is about 1.8 or greater and has a first exemplary range about than 1.8 to 2.2 and a second exemplary range greater than 2.2. Yet another exemplary range of the aspect ratio A/R range is about 2.2 to 2.8.

FIG. 3 illustrates three exemplary spinner axial cross-sections denoted as first, second, and third axial cross-sections B1, B2, and B3 as compared to a baseline axial cross-section B0. All three exemplary spinner axial cross-sections B1-B3 and the baseline cross-section B0 have the same radial distance R. The baseline cross-section B0 has a baseline axial distance A0. The exemplary first, second, and third axial cross-sections B1, B2, and B3 have first, second, and third aspect ratios A/R1, A/R2, and A/R3, equal to 1.80, 2.19, and 2.58 respectively. The baseline cross-section B0 has a baseline aspect ratio A/R0 of 1.41. The exemplary first, second, and third axial cross-sections B1, B2, and B3 are shaped and sized to improve crosswind and high angle of attack performance of the inlet 25 over that of the baseline cross-section B0 by reducing the extent or severity of flow separation within the inlet. The design of the spinner shape may include increasing the size of the spinner at a specific station or axial distance along the centerline axis 30 in order to improve inlet performance.

While there have been described herein what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A spinner for mounting to a rotor of an aircraft gas turbine engine, the spinner comprising:
   a conical upstream or forward spinner section extending aftwardly from a spinner tip, the conical upstream or forward spinner section having a decreasing slope which transitions directly into a convex downstream or aft spinner section, the convex downstream or aft spinner section initially having a decreasing slope and subsequently having an increasing slope extending aftwardly to a spinner end which transitions directly into a leading edge of a fan blade platform,
   the spinner circumscribed about a centerline axis,
   the spinner having a spinner aspect ratio greater than 1.8, and
   wherein the spinner aspect ratio is an axial distance between the spinner tip and a spinner end divided by a radial distance from the engine axial centerline axis to the spinner end.

2. The spinner as claimed in claim 1 further comprising the spinner aspect ratio being in a range of 2.0-2.2.

3. The spinner as claimed in claim 1 further comprising the spinner aspect ratio being in a range of 2.2-2.8.

4. The spinner as claimed in claim 1 further comprising the aft spinner section substantially tangential to platform leading edges of platforms of the fan blades.

5. The spinner as claimed in claim 1 further comprising the aft spinner section having a cambered or an elliptical axially curved cross-section.

6. The spinner as claimed in claim 5 further comprising the forward spinner section substantially tangential to the aft spinner section at their intersection.

7. The spinner as claimed in claim 6 further comprising the spinner aspect ratio being in a range of 2.0-2.2.

8. The spinner as claimed in claim 6 further comprising the spinner aspect ratio being in a range of 2.2-2.8.

9. The spinner as claimed in claim 6 further comprising the aft spinner section substantially tangential to platform leading edges of platforms of the fan blades.

10. The spinner as claimed in claim 1 further comprising a spinner axial cross-section having a longer spinner axial distance as compared to a baseline axial distance of a baseline cross-section and the spinner aspect ratio greater than a baseline aspect ratio of the baseline cross-section.

11. The spinner as claimed in claim 1, wherein a slope at the conical upstream or forward spinner section exceeds a slope at the convex downstream or aft spinner section, and wherein a slope at a leading edge of a fan blade platform exceeds the slope at the convex downstream or aft spinner section.

12. An aircraft gas turbine engine fan assembly comprising:
   a fan casing surrounding an array of fan blades mounted to and extending radially outwardly from a rotor circumscribed about a centerline axis,
   a nacelle surrounding the fan casing,
   a spinner circumscribing the centerline axis and mounted to the rotor,
   the spinner including a conical upstream or forward spinner section extending aftwardly from a spinner tip, the conical upstream or forward spinner section having a decreasing slope which transitions directly into a convex downstream or aft spinner section, the convex downstream or aft spinner section initially having a decreasing slope and subsequently having an increasing slope extending aftwardly to a spinner end which transitions directly into a leading edge of a fan blade platform,
   the spinner circumscribed about a centerline axis,
   the spinner having a spinner aspect ratio greater than 1.8, and
   wherein the spinner aspect ratio is an axial distance between the spinner tip and a spinner end divided by a radial distance from the engine axial centerline axis to the spinner end.

13. The assembly as claimed in claim 12 further comprising the spinner aspect ratio being in a range of 2.0-2.2.

14. The assembly as claimed in claim 12 further comprising the spinner aspect ratio being in a range of 2.2-2.8.

15. The assembly as claimed in claim 12 further comprising the aft spinner section substantially tangential to platform leading edges of platforms of the fan blades.

16. The assembly as claimed in claim 12 further comprising the aft spinner section having a cambered or an elliptical axially curved cross-section.

17. The assembly as claimed in claim 16 further comprising the forward spinner section substantially tangential to the aft spinner section at their intersection.

18. The assembly as claimed in claim 17 further comprising the spinner aspect ratio being in a range of 2.0-2.2 and the aft spinner section substantially tangential to platform leading edges of platforms of the fan blades.

19. The assembly as claimed in claim 17 further comprising the spinner aspect ratio being in a range of 2.2-2.8 and the aft spinner section substantially tangential to platform leading edges of platforms of the fan blades.

20. The assembly as claimed in claim 12, wherein a slope at the conical upstream or forward spinner section exceeds a slope at the convex downstream or aft spinner section, and wherein a slope at a leading edge of a fan blade platform exceeds the slope at the convex downstream or aft spinner section.

* * * * *